United States Patent
Korn et al.

(10) Patent No.: US 6,503,304 B2
(45) Date of Patent: Jan. 7, 2003

(54) FLOWABLE AND PUMPABLE METALLIC-PIGMENT SEMIFINISHED PRODUCT FOR THE PRODUCTION OF PAINTS AND LACQUERS

(75) Inventors: Andreas Korn, Neuhaus (DE); Robert Maul, Winkelhaid (DE)

(73) Assignee: ECKART-Werke Standard-Bronzepulver-Werke Carl Eckart GmbH & Co., Fürth (DE)

( * ) Notice: Subject to any disclaimer, the term of this patent is extended or adjusted under 35 U.S.C. 154(b) by 0 days.

(21) Appl. No.: 09/760,300

(22) Filed: Jan. 16, 2001

(65) Prior Publication Data

US 2001/0009130 A1 Jul. 26, 2001

(30) Foreign Application Priority Data

Jan. 15, 2000 (DE) .......................... 100 01 437

(51) Int. Cl.$^7$ .......................... C09D 17/00; C09C 1/62; C09C 1/64
(52) U.S. Cl. .................. 106/14.11; 106/14.12; 106/14.21; 106/14.34; 106/14.39; 106/14.44; 106/403; 106/404; 106/419; 106/461; 106/462; 106/479; 106/499; 106/504
(58) Field of Search .......................... 106/14.11, 14.12, 106/14.21, 14.34, 14.39, 14.44, 403, 404, 419, 461, 462, 479, 499, 504

(56) References Cited

U.S. PATENT DOCUMENTS

| | | | | |
|---|---|---|---|---|
| 3,839,254 A | * | 10/1974 | Fang | .......................... 106/403 |
| 4,617,056 A | | 10/1986 | Mosser et al. | |
| 4,621,112 A | * | 11/1986 | Backhouse et al. | .......... 106/404 |
| 4,675,358 A | * | 6/1987 | Frangou | .......................... 524/439 |
| 4,693,754 A | | 9/1987 | Kondis | |
| 5,057,156 A | * | 10/1991 | Kuwajima et al. | ........ 106/14.12 |
| 5,102,457 A | * | 4/1992 | Braig et al. | ............... 106/14.16 |
| 5,283,124 A | * | 2/1994 | Fujibayashi et al. | ......... 523/404 |
| 5,348,579 A | | 9/1994 | Jenkins et al. | |
| 5,356,469 A | | 10/1994 | Jenkins et al. | |
| 5,470,385 A | * | 11/1995 | Keemer et al. | ......... 106/287.17 |
| 5,480,481 A | | 1/1996 | Setoguchi et al. | |
| 5,603,865 A | * | 2/1997 | DePue et al. | ................. 106/400 |
| 5,755,869 A | * | 5/1998 | Olson et al. | ................. 106/403 |
| 6,165,621 A | * | 12/2000 | Kasari et al. | ................. 427/380 |
| 6,287,695 B1 | * | 9/2001 | Kaupp et al. | ................ 428/403 |
| 6,335,390 B1 | * | 1/2002 | Seeger et al. | ............. 427/419.1 |

FOREIGN PATENT DOCUMENTS

| | | |
|---|---|---|
| DE | 39 30 687 A1 | 7/1992 |
| DE | 195 15 538 A1 | 10/1996 |
| DE | 197 28 856 A1 | 1/1999 |
| EP | 0 061 223 B1 | 3/1982 |
| EP | 0 104 075 | 3/1984 |
| EP | 0 259 748 | 3/1988 |
| EP | 0 583 919 B1 | 2/1994 |
| EP | 0 633 297 A1 | 1/1995 |
| EP | 0 653 465 A1 | 5/1995 |
| EP | 0 860 484 A2 | 8/1998 |
| EP | 0 962 505 A1 | 12/1999 |
| WO | WO 98/53017 | 11/1998 |

OTHER PUBLICATIONS

Andrea Rudolf et al: Oberflächenmodifizierte Zinkstaubpigmente in Korrosionsschutzbeschichtungen. In: farbe + lack, Dec. 1994, pp. 1003–1005.

\* cited by examiner

*Primary Examiner*—Anthony J. Green
(74) *Attorney, Agent, or Firm*—Browdy and Neimark

(57) ABSTRACT

A flowable and pumpable aqueous semifinished product of gassing stability for the production of paints and lacquers comprises water, a pre-stabilized metallic pigment and an anticorrosive pigment.

19 Claims, No Drawings

FLOWABLE AND PUMPABLE METALLIC-PIGMENT SEMIFINISHED PRODUCT FOR THE PRODUCTION OF PAINTS AND LACQUERS

BACKGROUND OF THE INVENTION

1. Field of the Invention

The invention relates to an aqueous, flowable and pumpable semifinished product of gassing stability and with metallic pigments as an initial product for the production of paints and lacquers. The invention further relates to a corresponding stabilized metallic paste.

2. Background Art

Metallic pigments find multiple use as components of paints and lacquers. As a rule, they are processed into paints or lacquers together with one or several binders, one or several solvents as well as various auxiliary agents. The metallic pigments are mostly used in the form of powders or pastes, recently also as solid concentrates, solvents without binders, but also in the form of coarse-grained particles. Another form of delivery are liquid semifinished products which contain solvents and possibly binders.

Incorporating metallic pigments in aqueous surface-coating systems is accompanied with a number of difficulties regardless of the way of delivery. Frequently, metallic powders and pastes are hard to disperse. In particular in the case of liquid semifinished products, chemical reactions with water will take place, resulting in hydrogen emission which will as a rule lead to a loss of the optical properties. In addition, the pulverulent pigments have the drawback of strongly dusting, requiring a number of complicated steps, such as explosion protection, at the workplace.

EP 0 860 484 A2 describes a dispersion of flaky pigments of a pigment content of 20 to 55 per cent and a substrate which is liquid at room temperature and compatible with binders for aqueous surface-coating systems. This document does not mention water as a substrate and in as much as it talks of stability, this refers to the dispersion and not to the gassing behavior.

WO 98/53017 specifies the stabilization of an aqueous bronze printing color by an additive system of an emulsifiable wax, a tenside, a base of a pH of 7 to 12 and at least one additive out of the group of antioxidants, coupling agents, antistatic agents, nucleation agents, metal deactivators, lubricants/slip agents/antiblocking agents, UV inhibitors, fire retardants, biocides as well as water.

DE 197 28 856 A1 specifies a water-dilutable coating composition which comprises at least one ester of a phosphoric acid and at least one fatty alcohol polyglycol ether.

Literature describes quite a number of methods for the production of stabilized metallic pastes to be used in aqueous systems.

U.S. Pat. No. 5,348,579 specifies aluminum pastes stabilized with phosphosilicates. The pastes contain exclusively organic solvents, but no water.

U.S. Pat. No. 5,356,469 specifies a metallic paste which contains solvents and a phosphosilicate pigment in combination with the anion of a heteropoly acid. The specification emphasizes that the combination of a phosphosilicate pigment and a heteropoly anion is essential.

U.S. Pat. No. 4,693,754 describes a stabilization of aluminum pigment pastes by vanadate and chromate. The aluminum pigments are treated in the ball mill or, in a subsequent step, by a mixture of vanadium and/or chromium salts in water and an organic liquid.

U.S. Pat. No. 4,617,056 describes a metallic paste on the basis of phosphate, molybdate and chromate, the ions necessary for this stabilization originating from a liquid binder.

U.S. Pat. No. 5,480,481 teaches to coat an aluminum pigment with molybdic acid.

According to European patent 0 104 075, aluminum particles are coated with "vanadium".

A two-stage molybdate/phosphoric acid ester stabilization is presented in EP 0 653 465 A1. Stabilization is emphasized to have no influence on optical or surface-coating properties.

A molybdate/phosphate stabilization specified in EP 0 633 297 A1 is very similar to that of EP 0 653 465 A1.

EP 0 583 919 B1 also describes molybdate stabilization.

All the known stabilization methods listed above have the drawback of regularly failing with a pH greater than 9.0 and of not positively affecting the properties in terms of corrosion engineering and processing.

Moreover, pastes do not disperse easily, thus conflicting with rapid automatic processability. Storage stability of the known aqueous semifinished products is not sufficient, the pigments tend to agglomerating. However, industry demands for rapid processability and increasing automation.

SUMMARY OF THE INVENTION

It is an object of the invention to provide for a way of delivery of metallic pigments that does not have the above-mentioned drawbacks and moreover enables the final product to be improved in terms of corrosion engineering and universal compatibility. The idea is to have a form of delivery which is in particular aqueous, easily dispersible and flowable, exhibiting gassing stability and ease of handling and accessibility to automated processing. Moreover, the idea is to have a flowable and pumpable preparation which offers considerable advantages to the processing industry.

According to the invention, this object is attained by a flowable and pumpable semifinished product of gassing stability on an aqueous basis for the production of paints and lacquers, comprising water, a pre-stabilized metallic pigment and an anticorrosive pigment.

This semifinished product according to the invention improves the properties, in terms of corrosion engineering, of the originating lacquer coating and ensures the use of metallic pigments in anticorrosive systems which, for combat of flash rust, have a pH>9. Generally, this system offers a distinct improvement of gassing stability in paint formulations that are critical of metallic pigments.

Surprisingly it has been found that stabilization of metallic pigments in aqueous, flowable semifinished products is possible by anticorrosive pigments, for instance phosphosilicate pigments, without any further additions if the metallic pigments are pre-stabilized in a manner known per se.

It has further been found that a treatment of the anticorrosive pigments prior to the production of the semifinished product in which the size of the pigment particles decreases (from approximately 3 μm to approximately 2.3 μm) works in favor of the optical properties, in particular in the case of optically exacting applications. This also helps prevent agglomeration of the anticorrosion pigments.

The metal pigments consist of aluminum, copper, zinc, tin or alloys of these elements, preferably aluminum. Suitably, they are pre-stabilized by systems of phosphor-containing organic compounds and bases, by coating with silicates or organically modified silanes, by polymers (for example acrylates) or by one of the above-mentioned methods. Stabilization is also feasible by phosphoric acid ester as specified in DE 39 30 687.

The semifinished product according to the invention comprises 10 to 50% metallic pigment, 0.1 to 30 % active anticorrosive pigment as well as 0 to 15% dispersion additive, 0 to 2.5% defoamer, 0 to 1.5% thixotroping agent and 89.9 to 20% water. The anticorrosive pigment is preferably selected from the group of strontium zinc phosphosilicate, zinc aluminum polyphosphate hydrate, zinc calcium aluminum strontium phosphate silicate hydrate, zinc calcium strontium orthophosphate silicate hydrate, strontium aluminum polyphosphate hydrate, calcium aluminum polyphosphate silicate hydrate, and sodium and/or calcium and/or zinc molybdate or phospho-molybdate and zinc phosphate complex.

In keeping with a preferred embodiment of the invention, the anticorrosive pigment is available in a pasting which comprises 50 to 90% anticorrosive pigment, 10 to 50% water as well as 0 to 20% dispersing agent, 0 to 2.5% defoamer, and 0 to 1.5% thixotroping additive as well as further additives as the case may be.

For the production of the semifinished product according to the invention, 3 to 35 parts of the anticorrosive pigment or of the anticorrosive pigment paste are suspended in 10 to 67 parts of water, and during stirring at approximately 300 to 700 rpm, they are added in portions to the prepared metallic paste (30 to 70 parts) for a flow pattern to show that is similar to a "doughnut effect". Then stirring takes place for approximately 10 to 15 minutes, after which the remaining quantity is charged and another stirring job takes place at approximately 1200 rpm for approximately 10 minutes.

In a preferred embodiment of the invention, the anticorrosive pigment is pasted or communicated prior to the actual production of the semifinished product. Pasting takes place with the above-mentioned quantities being used in a suitable aggregate, for instance in a bead mill, for a period of 5 to 30 minutes at 8000 to 12000 rpm with the addition of water, a dispersing agent as well as possibly a defoamer and/or a thixotroping additive. The defoamer reduces foaming which easily occurs due to the high inclusion of air; the thixotroping additive prevents the pigments from depositing during storage.

In this paste, the particle size of the anticorrosive pigment may be reduced by as much as 30% as opposed to the initial pigment.

In keeping with a special embodiment of the invention, the anticorrosive pigment, which is suspended in water as specified above, is added to the metallic powder already during production of the metallic paste and kneaded together therewith, forming a paste of a metal content of 50 to 75%.

Details of the invention will be explained below, taken in conjunction with preferred exemplary embodiments.

DESCRIPTION OF PREFERRED EMBODIMENTS

EXAMPLE 1

6 g modified zinc aluminum polyphosphate hydrate anticorrosive pigment (Heucophos® ZAPP of Heubach) are suspended in 40 g water and, by stirring at 500 rpm, added in portions to 54 g aluminum pigment paste (Hydroxal W 4 n.1. of Eckart-Werke) until a doughnut effect can be observed. Then stirring takes place for another 10 minutes before the remaining quantity is charged and another stirring job takes place at 1200 rpm for another 10 minutes.

A polyester-based, aqueous solution system of a pH of 9.2 is produced by the obtained semifinished product.

The quality of stabilization is determined by means of a 40° C. gassing test.

The semifinished product develops 5 mm hydrogen in 30 days; a semifinished product without anticorrosive pigment, 30 mm in 30 days; the paint preparation with anticorrosive pigment, 5 mm in 30 days; and the paint preparation without anticorrosive pigment, 30 mm in 7 days.

EXAMPLE 2

70 g strontium zinc phosphosilicate anticorrosive pigment (HALOX® SZP 391 of Lawrence-Industries) are comminuted together with 20 g water, 7 g dispersing agent (EFKA® 4550 of EFKA ADDITIVES B.V.), 0.5 g defoamer (Byk® 024 of Byk Chemie) and 0.1 thixotroping agent (Optigel® SH of Südchemie) in a bead mill for a period of 15 minutes at 12000 rpm.

10 g of the obtained paste are suspended in 40 g water and half of this is added to 50 g aluminum pigment paste (Hydroxal W 24 n.1. of Eckart-Werke) by stirring at 500 rpm.

An aqueous paint preparation is produced with the obtained paste. The stability in the 40° C. gassing test is increased by approximately five times as opposed to non-stabilized paint, the optical appearance of spraying is excellent.

EXAMPLE 3

96.2 g of a phosphor-containing organic prestabilized aqueous Metalure® suspension (Avery, 20% aluminum content) are stirred together with 3.8 g of a paste of 2.8 g Halox® SZP 391 in 1.0 g water.

A 40° C. test is carried out for the obtained semifinished product and an aqueous paint (styrene/acrylate) is produced.

In the 40° C. test, the paste and the paint exhibit a stability which is raised by the factor 5 as compared to a paste and a paint that have been prepared without the addition of an anticorrosive pigment.

The L* values of the optical test are:

|  | 110° | 75° | 70° | 55° | 45° | 35° | 25° |
|---|---|---|---|---|---|---|---|
| Instab. | 24.3 | 27.22 | 27.84 | 33.42 | 42.82 | 59.70 | 90.65 |
| 7.5% stab. | 24.72 | 27.67 | 28.53 | 34.34 | 44.23 | 61.75 | 93.57 |

EXAMPLE 4

64 g of an aluminum pigment powder (initial product of HYDROXAL W 4 n.1) are kneaded together with a suspension of 9 g of a strontium zinc phosphosilicate anticorrosive pigment (HALOX® from Lawrence Industries) in 18 g water in a kneading aggregate until a homogeneous paste is obtained.

The paste thus obtained is used for the production of an aqueous industrial paint preparation (styrene acrylate system) of pH=9.2. In the 40° C. gassing test, the paste and the paint exhibit a stability raised by the factor 5 as compared to a paste and a paint that have been prepared without the addition of an anticorrosive pigment.

Performance of the 40° C. Gassing Test

The semifinished product according to the invention is added to the surface-coating system that is to be tested in such a quantity that the paint contains approximately 10% aluminum. 300 g of this are metered into a gas-washing bottle which is equipped with a double chamber bubble counter.

Water bath storage takes place at 40° C. The originating hydrogen is collected in the top and the millimeters of the displaced water column are read.

Test of the Optical Properties

The produced paint preparations are applied at identical conditions on an automatic Langguth spraying apparatus and burned at 120° C. for 30 min.

For testing the optical properties, the L* values were measured with the aid of the Optronik multi-flash goniophotometer from eight different angles for the flop behavior to be determined approximately.

What is claimed is:

1. A flowable and pumpable aqueous semifinished product of gassing stability for the production of paints and lacquers, comprising 10 to 67 parts of water;

30 to 70 parts of a pre-stabilized metallic pigment; and 3 to 35 parts of an anticorrosive pigment.

2. A semifinished product according to claim 1, wherein the metallic pigment consists of aluminum, copper, zinc, tin or alloys of aluminum, copper, zinc or tin.

3. A semifinished product according to claim 1, wherein the metallic pigment is pre-stabilized by phosphor-containing organic compounds and bases, by coating with silicates or organically modified silanes, by polymers or by phosphoric acid ester.

4. The semifinished product of claim 3 wherein said polymers comprise acrylates.

5. A semifinished product according to claim 1, wherein the anticorrosive pigment is selected from the group consisting of strontium zinc phosphosilicate, zinc aluminum polyphosphate hydrate, zinc calcium aluminum strontium phosphate silicate hydrate, zinc calcium strontium orthophosphate silicate hydrate, strontium aluminum polyphosphate hydrate, calcium aluminum polyphosphate silicate hydrate, sodium molybdate, calcium molybdate, zinc molybdate, sodium phospho-molybdate, calcium phospho-molybdate and zinc phospho-molybdate.

6. A method for the production of a semifinished product according to claim 1, wherein the following steps are performed:

3 to 35 parts of the anticorrosive pigment or of an anticorrosive pigment paste are suspended in 10 to 67 parts of water, and during stirring at approximately 300 to 700 rpm are added in portions to a prepared metallic pigment paste (30 to 70 parts) in a doughnut-shaped flow pattern;

then stirring takes place for approximately 10 to 15 minutes, after which a remaining quantity of the anticorrosive pigment or of the anticorrosive pigment paste is charged and another stirring job takes place at approximately 1200 rpm for approximately 10 minutes.

7. A method for the production of the semifinished product according to claim 6, wherein the anticorrosive pigment is pasted in a suitable aggregate, for a period of 5 to 30 minutes at 8000 to 12000 rpm with the addition of water and a dispersing agent.

8. The method of claim 7 further comprising adding at least one of a defoamer and thixotroping additive.

9. The method of claim 7 wherein the anticorrosive pigment is pasted in a bead mill.

10. A stabilized aqueous metallic paste, wherein it contains a pre-stabilized metallic pigment and 5 to 20% of an anticorrosive pigment selected from the group consisting of strontium zinc phosphosilicate, zinc aluminum polyphosphate hydrate, zinc calcium aluminum strontium phosphate silicate hydrate, zinc calcium strontium orthophosphate silicate hydrate, strontium aluminum polyphosphate hydrate, calcium aluminum polyphosphate silicate hydrate, sodium molybdate, calcium molybdate, zinc molybdate, soldium phospho-molybdate, calcium phospho-molybdate and zinc phospho-molybdate.

11. A method for the production of a metallic paste, wherein 60 to 80 parts of a metallic powder containing a pre-stabilized metallic pigment are added to a suspension of 5 to 25 parts of an anticorrosive pigment in 18 parts water and are kneaded together therewith in a kneading aggregate, forming a paste.

12. In a method of making a paint or lacquer comprising mixing components to form said paint or lacquer, the improvement wherein at least one of said components comprises the product of claim 1.

13. In a method of making a paint or lacquer comprising mixing components to form said paint or lacquer, the improvement wherein at least one of said components comprises the product of claim 2.

14. In a method of making a paint or lacquer comprising mixing components to form said paint or lacquer, the improvement wherein at least one of said components comprises the product of claim 3.

15. In a method of making a paint or lacquer comprising mixing components to form said paint or lacquer, the improvement wherein at least one of said components comprises the product of claim 5.

16. In a method of making a paint or lacquer comprising mixing components to form said paint or lacquer, the improvement wherein at least one of said components comprises a product produced by the method of claim 6.

17. In a method of making a paint or lacquer comprising mixing components to form said paint or lacquer, the improvement wherein at least one of said components comprises a product produced by the method of claim 7.

18. In a method of making a paint or lacquer comprising mixing components to form said paint or lacquer, the improvement wherein at least one of said components comprises the paste of claim 10.

19. In a method of making a paint or lacquer comprising mixing components to form said paint or lacquer, the improvement wherein at least one of said components comprises a product produced by the method of claim 11.

\* \* \* \* \*